United States Patent
Park

(10) Patent No.: US 7,305,287 B2
(45) Date of Patent: Dec. 4, 2007

(54) AGV CONTROL SYSTEM AND METHOD

(75) Inventor: Tae-Eun Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 666 days.

(21) Appl. No.: 10/767,742

(22) Filed: Jan. 30, 2004

(65) Prior Publication Data

US 2005/0080524 A1    Apr. 14, 2005

(30) Foreign Application Priority Data

Oct. 14, 2003   (KR) ...................... 10-2003-0071472

(51) Int. Cl.
  *G05D 1/02*     (2006.01)
  *G01S 5/14*     (2006.01)
  *G01S 5/02*     (2006.01)

(52) U.S. Cl. ............................ 701/23; 701/24; 701/27; 180/168; 318/587; 340/988

(58) Field of Classification Search ............ 701/23–24, 701/27; 180/168; 318/587; 340/988; *G05D 1/02*; *G01S 5/14, 5/02*
See application file for complete search history.

(56) References Cited

U.S. PATENT DOCUMENTS

| | | | | |
|---|---|---|---|---|
| 4,780,817 A | * | 10/1988 | Lofgren ........................ | 701/23 |
| 4,926,103 A | * | 5/1990 | Summerville et al. ...... | 318/587 |
| 5,091,855 A | * | 2/1992 | Umehara et al. ............. | 701/23 |
| 5,163,001 A | * | 11/1992 | Luke, Jr. ...................... | 701/23 |
| 5,280,431 A | * | 1/1994 | Summerville et al. ........ | 701/24 |
| 5,283,739 A | * | 2/1994 | Summerville et al. ........ | 701/23 |
| 5,764,014 A | * | 6/1998 | Jakeway et al. ............ | 318/587 |
| 6,049,745 A | * | 4/2000 | Douglas et al. ................ | 701/23 |
| 6,073,065 A | * | 6/2000 | Brown et al. .................. | 701/36 |

(Continued)

FOREIGN PATENT DOCUMENTS

JP        08-113319        5/1996

(Continued)

OTHER PUBLICATIONS

Gillula et al. How to teach a van to drive—An undergraduate perspective on the 2005 DARPA Grand Challenge, Jun. 2006, IEEE Control Systems Magazine, pp. 19-26.*

(Continued)

*Primary Examiner*—Cuong Nguyen
(74) *Attorney, Agent, or Firm*—Stanzione & Kim, LLP

(57) ABSTRACT

An automated guided vehicle control system and method which allows overall conveying time to be reduced by simultaneously moving a plurality of automated guided vehicles (AGVs) to working locations without interfering with each other. For this purpose, when there is a conveyance request, one of a plurality of the AGVs operated on a single guide path is assigned work. Further, it is determined whether another automated guided vehicle moving to a working location exists on the guide path. Also information on current and working locations of the automated guided vehicles is read if the automated guided vehicle moving to the working location exists on the guide path. Further, it is determined whether simultaneous movements are possible based on the read information. The automated guided vehicle waiting for work is moved if the simultaneous movements are possible. Accordingly, the overall convey time is reduced by simultaneously moving the AGVs to working locations or by previously moving the AGVs to optimal locations without interfering with each other, so that conveying efficiency of the AGVs is improved.

15 Claims, 4 Drawing Sheets

U.S. PATENT DOCUMENTS

| | | | |
|---|---|---|---|
| 6,345,217 B1 * | 2/2002 | Zeitler et al. | 701/23 |
| 6,445,984 B1 * | 9/2002 | Kellogg | 701/23 |
| 6,799,099 B2 * | 9/2004 | Zeitler et al. | 701/23 |
| 2004/0122570 A1 * | 6/2004 | Sonoyama et al. | 701/23 |

FOREIGN PATENT DOCUMENTS

| | | |
|---|---|---|
| JP | 10031515 A * | 2/1998 |
| JP | 2002-175117 | 6/2002 |

OTHER PUBLICATIONS

AGV routing for conflict resolution in AGV systems, Naiqi Wu; MengChu Zhou; Robotics and Automation, 2003. Proceedings. ICRA '03. IEEE International Conference on, vol. 1, Sep. 14-19, 2003 pp. 1428-1433 vol. 1, Digital Object Identifier 10.1109/ROBOT.2003.1241792.*

Modeling and deadlock avoidance of automated manufacturing systems with multiple automated guided vehicles, Naiqi Wu; MengChu Zhou; Systems, Man and Cybernetics, Part B, IEEE Transactions on, vol. 35, Issue 6, Dec. 2005 pp. 1193-1202, Digital Object Identifier 10.1109/TSMCB.2005.850141.*

Modeling and deadlock control of automated guided vehicle systems, Naiqi Wu; MengChu Zhou; Mechatronics, IEEE/ASME Transactions on, vol. 9, Issue 1, Mar. 2004 pp. 50-57, Digital Object Identifier 10.1109/TMECH.2004.823875.*

G. A. Koff, "Automatic guided vehicle: Application, control and planning," Material Flows, vol. 4, pp. 3-16, 1987.*

S. A. Reveliotis, "Conflict resolution in AGV systems," IIE Trans., vol. 32, No. 7, pp. 647-659, 2000.*

Liveness enforcing in closed AGV systems with dynamic routing, Roszkowska, E.; Robotics and Automation, 2004. Proceedings. ICRA '04. 2004 IEEE International Conference on, vol. 5, Apr. 26-May 1, 2004 pp. 5165-5170 vol. 5 Digital Object Identifier 10.1109/ROBOT.2004.1302537.*

Navigation of decentralized autonomous automatic guided vehicles in material handling, Berman, S.; Edan, Y.; Jamshidi, M.; Robotics and Automation, IEEE Transactions on, vol. 19, Issue 4, Aug. 2003 pp. 743-749, Digital Object Identifier 10.1109/TRA.2003.814513.*

A multi-agent based conflict-free routing approach of bi-directional automated guided vehicles, Breton, L.; Maza, S.; Castagna, Digital Object Identifier 10.1109/ACC.2006.1656652.*

G. Ulusoy, F. Sivrikaya-Serifoglu, and Ü. Bilge, "A genetic algorithm approach to the simultaneous scheduling of machines and automated guided vehicles," Comput. Oper. Res., vol. 24, No. 4, pp. 335-351, 1997.*

H. Yamashita, "Analysis of dispatching rules of AGV systems with multiple vehicles," IIE Trans., vol. 33, pp. 889-895, 2001.*

S. P. Singh and M. K. Tiwari, "An intelligent agent framework to determine optimal conflict-free path for an automated guided vehicles system," Int. J. Product. Res., vol. 40, No. 16, pp. 4195-4223, 2002.*

X. Li, T. Geng, Y. P. Yang, and X. Xu, "Multiagent AGV's dispatching system using multilevel decisions method," in Proc. 2002 American Control Conf., vol. 2, 2002, pp. 1135-1136.*

* cited by examiner

AGV CONTROL SYSTEM AND METHOD

CROSS-REFERENCE TO RELATED APPLICATIONS

This application claims the benefit of Korean Patent Application No. 2003-71472, filed Oct. 21, 2003 in the Korean Intellectual Property Office, the disclosure of which is incorporated herein by reference.

BACKGROUND OF THE INVENTION

1. Field of the Invention

The present invention relates generally to an automated guided vehicle control system and method and, more particularly, to an automated guided vehicle control system and method in which a control device placed at a remote location integrally controls operations of a plurality of automated guided vehicles moving on a single guide path.

2. Description of the Related Art

Generally, an Automated Guided Vehicle (AGV) is an apparatus to perform loading work to load articles placed at a predetermined loading location into the AGV, and unloading work to unload articles from the AGV to a predetermined unloading location.

Two AGVs are generally operated on a single guide path and are integrally controlled by a control device connected to the AGVs through wired or wireless communication lines.

The control device controls the AGVs to be operated on the single path without collisions.

However, when the two AGVs are operated on the single guide path, an operation of a first AGV is restricted by a location of a second AGV because a collision may occur between the two AGVs.

Accordingly, a conventional AGV control system prevents the AGVs from moving to working locations at the same time if movements of the AGVs have a possibility of interfering with each other.

For example, the first AGV is made to wait for work until the second AGV completes a movement to a working location thereof. When the movement of the second AGV is completed, the second AGV having performed the movement is made to wait for work, and the first AGV having waited for work moves to a working location thereof.

The conventional AGV control system is problematic in that, even though the first and second AGVs have the same moving direction, the first AGV may move to the working location thereof after the second AGV reaches the working location thereof, so that overall conveying time of the AGVs increases, thus reducing a conveying efficiency of the AGVs.

SUMMARY OF THE INVENTION

Accordingly, it is an aspect of the present invention to provide an AGV control system and method, which allows overall conveying time to be reduced by simultaneously moving AGVs to working locations without interfering with each other.

Additional aspects and/or advantages of the present invention will be set forth in part in the description which follows and, in part, will be obvious from the description, or may be learned by practice of the invention.

The above and/or other aspects of the present invention are achieved by providing a method of controlling a plurality of automated guided vehicles operated on a single guide path, including assigning work to an automated guided vehicle waiting for work when there is a conveyance request, determining whether another automated guided vehicle moving to a working location exists on the guide path, reading information on current and working locations of the automated guided vehicles if the automated guided vehicle moving to the working location exists on the guide path, determining whether simultaneous movements are possible based on the read information, and moving the automated guided vehicle waiting for work if the simultaneous movements are possible.

The above and/or other aspects of the present invention are also achieved by providing an automated guided vehicle control system, including a plurality of automated guided vehicles operated on a single guide path, a host computer to transmit a conveyance request to move articles from a predetermined loading location to a predetermined unloading location using one of the automated guided vehicles, and a control unit to assign work to the automated guided vehicle waiting for work according to the conveyance request from the host computer, to read information on current locations and working locations of the automated guided vehicles if automated guided vehicles moving to a working location exist, to determine that simultaneous movements are possible based on the read information, and to move the automated guided vehicle waiting for work to a working location thereof if the simultaneous movements are possible.

BRIEF DESCRIPTION OF THE DRAWINGS

These and other aspects and advantages of the present invention will become apparent and more readily appreciated from the following description of the preferred embodiments, taken in conjunction with the accompanying drawings of which.

DETAILED DESCRIPTION OF THE PREFERRED EMBODIMENTS

Figure 1:
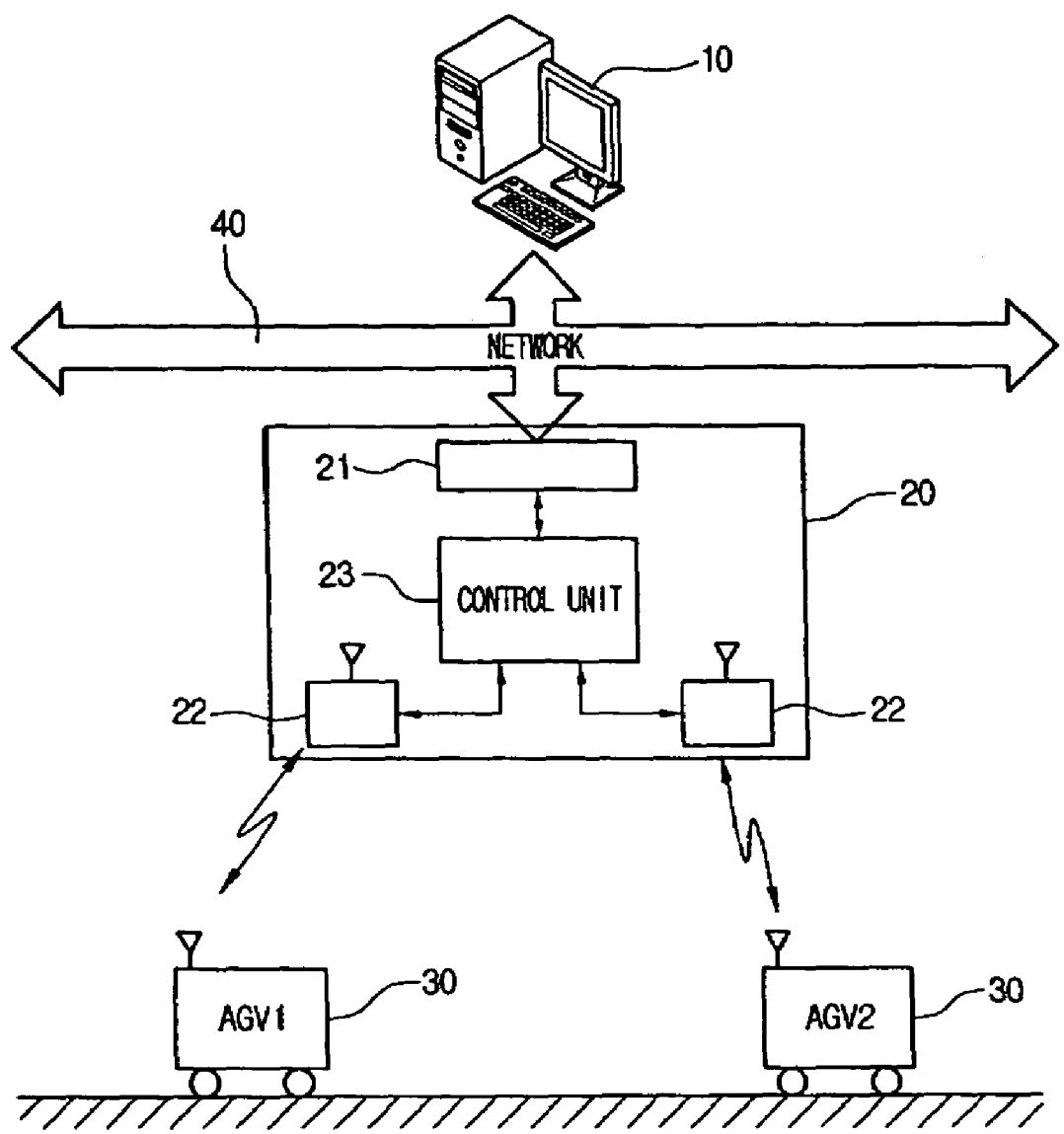
FIG. 1 is a control block diagram of an AGV control system, according to an embodiment of the present invention.

Reference will now be made in detail to the present preferred embodiments of the present invention, examples of which are illustrated in the accompanying drawings, wherein like reference numerals refer to like elements throughout. The embodiments are described below in order to explain the present invention by referring to the figures.

FIG. 1 is a control block diagram of an AGV control system according to an embodiment of the present invention. As shown in FIG. 1, the AGV control system includes a host computer 10, a control device 20, and a plurality of AGVs 30.

The host computer 10 is a computer to transmit a conveyance request to the control device 20 to convey articles from a predetermined loading location to a predetermined unloading location. The loading and unloading locations are situated on both sides of a guide path.

The control device 20 functions to command the AGVs 30 waiting for work to perform loading and unloading work according to the conveyance request transmitted from the host computer 10.

The host computer 10 and the control device 20 are connected with each other through a network 40 to transmit and receive information.

The control device 20 includes a host interface unit 21, an AGV interface unit 22 and a control unit 23. The control unit 23 includes a microprocessor, an operation management module, an AGV management module, an operation assignment module and an operation performance module.

The control unit 23 further includes a concession determination module, a movement determination module, and an approach movement determination module. The concession determination module functions to determine whether an AGV may make a concession to another AGV on a guide path. The movement determination module functions to determine whether a movement to perform work assigned to an AGV is possible. The approach movement determination module functions to determine whether an AGV may perform a maximal approach movement to a working location thereof when the movement is impossible.

The control unit 23 assigns an operation to a first AGV when there is a conveyance request, and determines whether a second AGV may make a concession using a concession rule module. If the second AGV may not make the concession, the control unit 23 determines whether a movement of the first AGV is possible. If the movement of the first AGV is possible, the first AGV is moved to a relevant working location and performs work, and if the movement of the first AGV is impossible, the control unit 23 determines whether the first AGV may perform a maximal approach movement to the relevant working location. If the approach movement is possible, the first AGV is made to perform a maximal approach movement to the relevant working location. In contrast, if the approach movement is impossible, the first AGV is made to wait for work.

Figure 2:
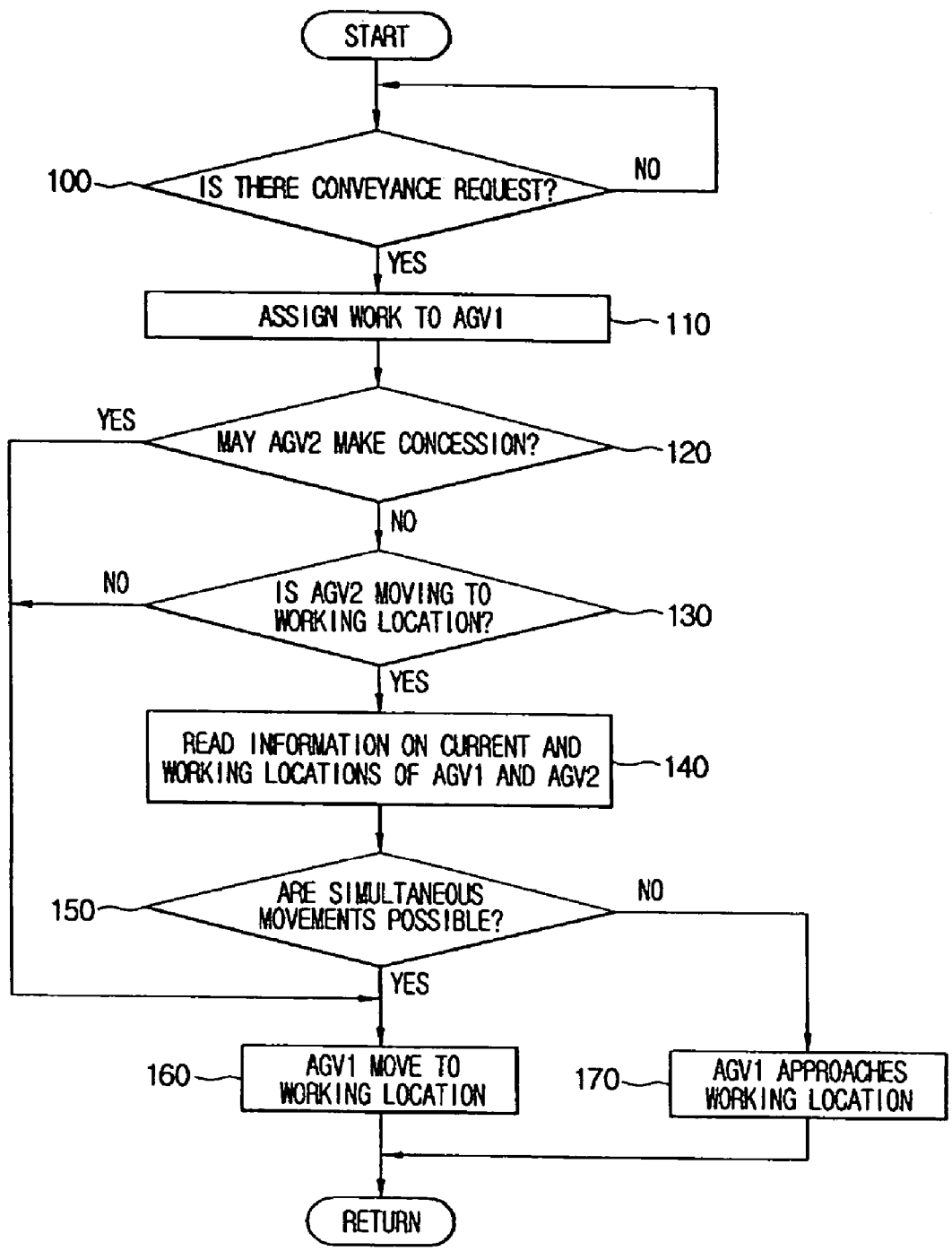
FIG. 2 is a flowchart showing overall control of the AGV control system of FIG. 1 according to another embodiment of the present invention.

FIG. 2 is a flowchart showing overall control of the AGV control system according to an embodiment of the present invention. For ease of description, an AGV assigned an operation is referred to as "AGV1", and a remaining AGV is referred to as "AGV2".

As shown in FIG. 2, when a request to convey articles from a predetermined loading location to a predetermined unloading location is transmitted from the host computer 10, the host computer 10 assigns work corresponding to the request to the AGV1 waiting for work in operations 100 and 110.

Figure 3:
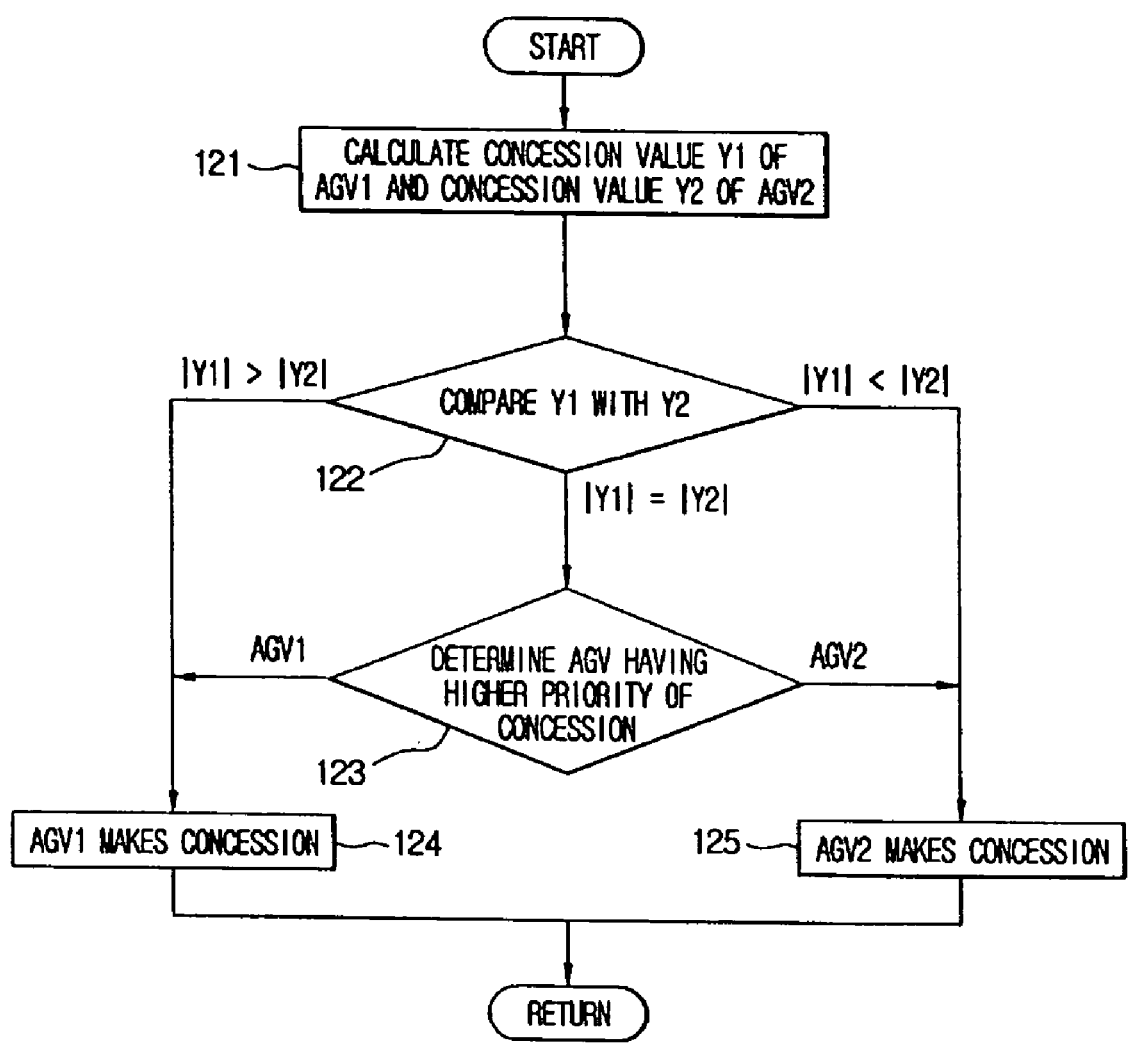
FIG. 3 is a flowchart showing a process of determining which of AGVs may make a concession.
Figure 4:
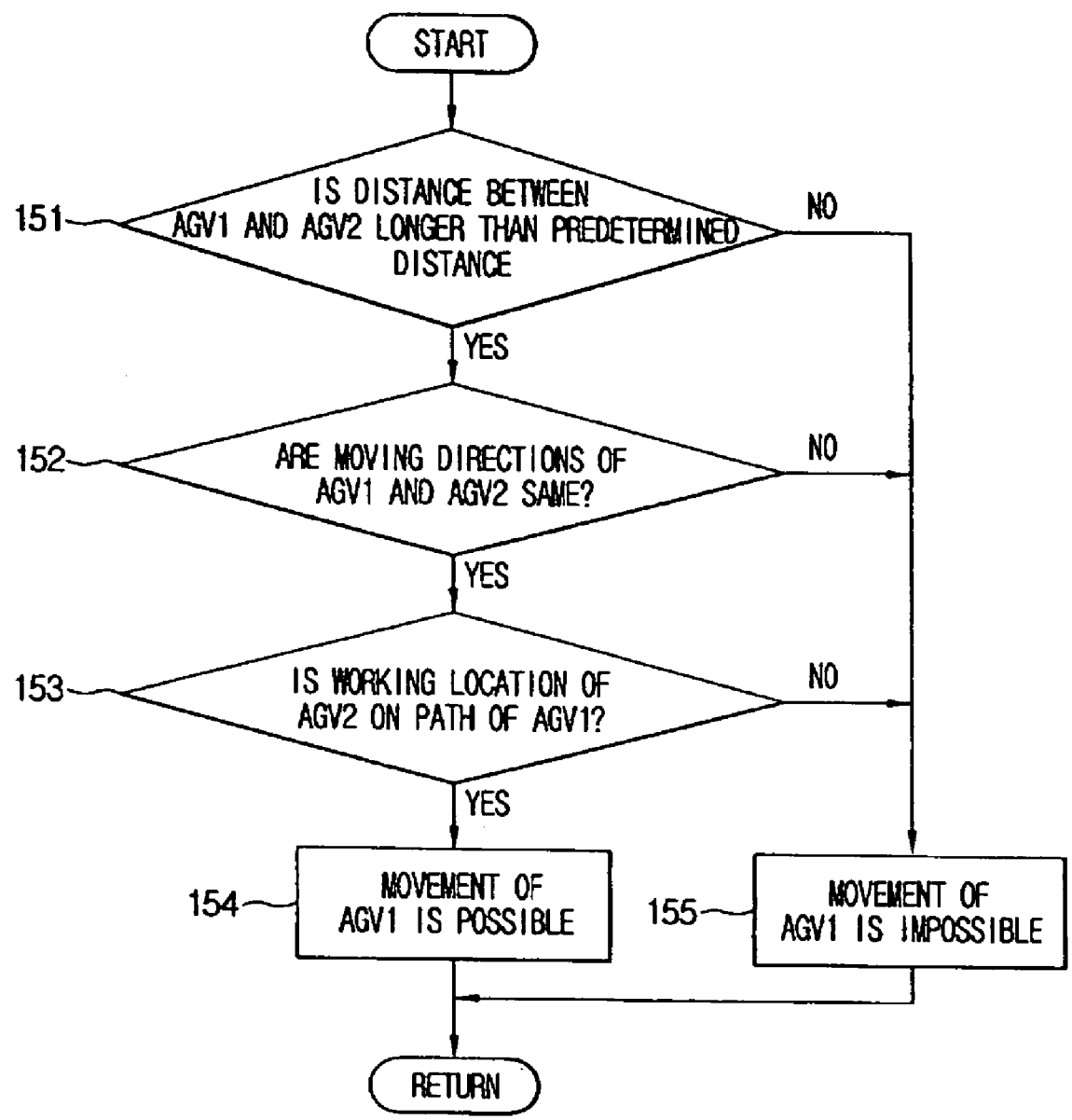
FIG. 4 is a flowchart showing a method of determining whether simultaneous movements of two AGVs are possible as shown in FIG. 2.

Thereafter, it is determined whether the AGV2 on the guide path may make a concession in operation 120. If, as a result of the determination in operation 120, the AGV2 may make a concession, the AGV1 is moved to a working location thereof and commanded to perform the assigned operation in operation 160. Referring to FIG. 3, a process of determining which of the AGV1 and the AGV2 may make a concession is described below. A concession value Y1 of the AGV1 and a concession value Y2 of the AGV2 are each calculated in view of an expected moving time taken to move from a current location to a working location, a priority, time taken to wait for work in operation 121. The concession value Y is calculated using the following equation:

$$Y = T1 - T2 - T3$$

where Y has a negative value and indicates a concession value, T1 indicates an expected moving time taken to move from a current location to a working location, T2 indicates a predetermined time corresponding to the priority, and T3 indicates the time taken to wait for work.

After the concession value Y1 of the AGV1 and the concession value Y2 of the AGV2 are calculated, it is determined which of the AGV1 and the AGV2 may make a concession by comparing the calculated concession values Y1 and Y2 in operation 122.

If an absolute value of the concession value Y1 is larger than the concession value Y2, it is determined that the AGV1 may make the concession in operation 124. If the concession value Y1 is smaller than the concession value Y2, it is determined that the AGV2 will make the concession in operation 125.

Additionally, if the concession values Y1 and Y2 are the same, loading work is considered to have a lower priority than unloading work. In contrast, if the AGVs are assigned a same type of work, an AGV having a shorter distance from a current location to a working location is considered to have a lower priority of concession. Based on these criteria, it is determined which of the AGV1 and the AGV2 has a higher priority of concession in operation 123.

If, as a result of the determination in operation 123, the AGV1 has a high priority of concession, it is determined that the AGV1 may make the concession in operation 124. If the AGV2 has a high priority of concession, it is determined that the AGV2 may make the concession.

Meanwhile, if, as a result of the determination in operation 120, the AGV2 may not make the concession, it is determined whether the AGV2 is moving to a working location in operation 130. If the AGV2 is not moving, the AGV1 is moved to the working location thereof in operation 160.

If, as a result of the determination in operation 130, the AGV2 is moving to the working location, information on current locations and working locations of the AGV1 and the AGV2 is read in operation 140. Furthermore, it is determined whether simultaneous movements of the AGV1 and the AGV2 to the working locations are possible based on the information on the current locations and working locations of the AGV1 and the AGV2 in operation 150.

The determining of whether the simultaneous movements of the AGV1 and the AGV2 to the working locations are possible is performed by calculating a distance between the working locations and moving directions of the AGV1 and the AGV2 based on the information about the current locations and working locations of the AGV1 and the AGV2 obtained in operation 140 and by determining whether a distance between the working locations of the AGV1 and the AGV2 is longer than a predetermined distance based on the calculated information in operation 151.

If, as a result of the determination in operation 151, the distance between the working locations of the AGV1 and the AGV2 is longer than the predetermined distance, it is determined whether the moving directions of the AGV1 and the AGV2 are the same in operation 152.

If, as a result of the determination in operation 152, the moving directions of the AGV1 and the AGV2 are same, it is determined whether the working location of the AGV2 is on a path of the AGV1 in operation 153.

If, as a result of the determination in operation 153, the working location of the AGV2 is not on the path of the AGV1, it is determined that the movement of the AGV1 is possible because the movements of the AGV1 and the AGV2 have no possibility of interfering with each other in operation 154. In other cases, it is determined that the movement of the AGV1 is impossible in operation 155.

If, as a result of the determination in operation 150 shown in FIG. 2, it is determined that the simultaneous movements of the AGV1 and the AGV2 to the working locations are impossible, the AGV1 performs a maximal approach movement to the working location of the AGV1 in operation 170.

That is, if, as the result of the determination in operation 150, it is determined that the simultaneous movements are impossible because the distance between the working locations of the AGV1 and the AGV2 is shorter than the predetermined distance, the moving directions of the AGV1 and the AGV2 are different, and/or the working location of the AGV2 is on the path of the AGV1, the AGV1 is moved to a location spaced apart by a predetermined distance from the work location of the AGV2 to perform a maximal approach movement to the working location of the AGV1, thus reducing overall conveying time.

As apparent from the above description, the present invention provides an AGV control system, which is capable of reducing overall conveying time by simultaneously moving the AGVs without interfering with each other, thus improving conveying efficiency of the AGVs.

Furthermore, the present invention allows an interference of the AGVs to be minimal, so that the overall conveying time is reduced, thus improving the conveying efficiency of the AGVs.

Furthermore, the present invention is effective in that life spans of AGVs are lengthened by reducing unnecessary movements of the AGVs.

Although a few preferred embodiments of the present invention have been shown and described, it should be appreciated by those skilled in the art that changes may be made in these embodiments without departing from the principles and spirit of the invention, the scope of which is defined in the claims and their equivalents.

What is claimed is:

1. A method of controlling a plurality of automated guided vehicles operated on a single guide path, comprising:
   assigning work to another automated guided vehicle waiting for work when there is a conveyance request;
   determining whether an automated guided vehicle moving to a working location exists on the guide path;
   reading information on respective current and working locations of the automated guided vehicle and the other automated guided vehicle if the automated guided vehicle moving to the working location exists on the guide path;
   determining whether movement along the guide path by the other automated guided vehicle to perform the work assigned thereto can be conducted concurrently with the movement along the guide path by the automated guided vehicle based on the read information; and
   moving the other automated guided vehicle along the guide path if the movements can be conducted concurrently.

2. The method as set forth in claim 1, further comprising:
   determining whether the automated guided vehicle and the other automated guided vehicle would interfere with each other on the single guide path based on the read information; and
   determining whether the movements can be conducted concurrently according to the respective current locations and working locations of the automated guided vehicle and the other automated guided vehicle, a distance between the working locations of the automated guided vehicle and the other automated guided vehicle, and respective moving directions of the automated guided vehicle and the other automated guided vehicle.

3. The method as set forth in claim 2, wherein it is determined that the movements can be conducted concurrently if the distance between the working locations of the automated guided vehicle and the other automated guided vehicle is longer than a predetermined distance, the moving directions of the automated guided vehicle and the other automated guided vehicle are the same, and the working location of the automated guided lies on a path of movement of the other automated guided vehicle.

4. The method as set forth in claim 2, wherein the automated guided vehicle waiting for work is moved to a predetermined location if it is determined that the movements cannot be conducted concurrently.

5. An automated guided vehicle control system, comprising:
   a plurality of automated guided vehicles operated on a single guide path;
   a host computer to transmit a conveyance request to move articles from a predetermined loading location to a predetermined unloading location; and
   a control unit to assign work to an automated guided vehicle waiting for work according to the conveyance request from the host computer, to read information on respective current locations and working locations of the automated guided vehicles if the automated guided vehicles are moving to respective working locations on the single guide path, to determine if movements by the automated guided vehicle waiting for work may be conducted on the single guide path concurrently with movements along the single guide path by the automated guided vehicles based on the read information, and to move the automated guided vehicle waiting for work along the single guide path to a working location thereon if the movements of the automated guided vehicles and the automated guided vehicle waiting for work can be conducted concurrently.

6. The automated guided vehicle control system as set forth in claim 5, wherein the control unit determines whether the movements can be conducted concurrently based on the read information on the respective current locations and working locations of the automated guided vehicles and the automated guided vehicle waiting for work and respective moving directions of the automated guided vehicles and the automated guided vehicle waiting for work.

7. The automated guided vehicle control system as set forth in claim 6, wherein the control unit determines that the simultaneous movements can be conducted concurrently if the respective distance between the working locations of the automated guided vehicles and the automated guided vehicle waiting for work is longer than a predetermined distance, the respective moving directions of the automated guided vehicles and the automated guided vehicle waiting for work are the same, and the working location of the automated guided vehicle moving to the working location lies on a path of movement of the automated guided vehicle waiting for work.

8. The automated guided vehicle control system as set forth in claim 6, wherein the control unit moves the automated guided vehicle waiting for work to a location spaced apart by a predetermined distance from the working location thereof if it is determined that the movements of the automated guided vehicles and the automated guided vehicle waiting for work cannot be conducted concurrently.

9. A method of controlling a plurality of automated guided vehicles operated on a single guide path, comprising:
   assigning work to an automated guided vehicle waiting for work on the guide path while at least one other automated guided vehicle moving to a working location exists on the guide path; and moving the automated guided vehicle waiting for work along the guide path to perform the assigned work whenever it is determined that movements of both the automated guided vehicle waiting for work and the automated guided vehicle moving to a working location can be conducted concurrently on the guide path without interference between the two automated guided vehicles.

10. The method as set forth in claim 9, wherein the determining operation includes reading information on respective current and working locations of the two automated guided vehicles if the automated guided vehicle moving to the working location exists is present on the guide path.

11. An automated guided vehicle control system, comprising:
   a plurality of automated guided vehicles operated on a single guide path;
   a host computer to transmit a conveyance request to move articles from a predetermined loading location to a predetermined unloading location on the single guide path; and
   a control unit to assign work to one of the automated guided vehicles waiting for work according to the conveyance request from the host computer upon a positive determination that an automated guided vehicle is moving on the single guide path and to move the automated guided vehicle waiting for work along the single guide path toward the unloading location whenever it is determined that movements along the single guide path of the automated guided vehicle waiting for work and the automated guided vehicle already moving along the single guide path can be conducted concurrently without interference between the two automated guided vehicles.

12. The automated guided vehicle control system as set forth in claim 11, wherein the control unit determines whether the movements can be conducted concurrently based on respective current locations and working locations of the automated guided vehicles and moving directions of the automated guided vehicles.

13. The automated guided vehicle control system as set forth in claim 12, wherein the control system determines that the movements can be conducted concurrently if the distance between the respective working locations of the two automated guided vehicles is longer than a predetermined distance, the respective moving directions of the two automated guided vehicles are same, and the working location of the automated guided vehicle moving to the working location lies on a path of movement of the automated guided vehicle waiting for work.

14. The automated guided vehicle control system as set forth in claim 12, wherein the control unit moves the automated guided vehicle waiting for work to a location spaced apart by a predetermined distance from the working location if it is determined that the movements cannot be conducted concurrently.

15. A method of controlling automated guided vehicles comprising:
   assigning a work task to an idle automated guided vehicle, the work task to be performed on a single guide path;
   determining a presence of a working automated guided vehicle moving on the single guide path to perform another work task; and
   receiving respective instructions by the idle automated guided vehicle and the working automated guided vehicle from a central controller upon a positive determination that the working automated guided vehicle is present on the single guide path such that respective movement along the single guide path of the idle automated guided vehicle and the working automated guided vehicle is conducted concurrently to perform the work task and the other work task.

* * * * *